(12) United States Patent
Lai

(10) Patent No.: US 7,589,799 B2
(45) Date of Patent: Sep. 15, 2009

(54) ACTIVE ARRAY SUBSTRATE FOR A LIQUID CRYSTAL DISPLAY

(75) Inventor: Chi-Kuang Lai, Hsin-Chu (TW)

(73) Assignee: AU Optronics Corp., Hsin-Chu (TW)

(*) Notice: Subject to any disclaimer, the term of this patent is extended or adjusted under 35 U.S.C. 154(b) by 216 days.

(21) Appl. No.: 11/905,209

(22) Filed: Sep. 28, 2007

(65) Prior Publication Data

US 2008/0218649 A1 Sep. 11, 2008

(30) Foreign Application Priority Data

Mar. 6, 2007 (TW) .............................. 96107604 A

(51) Int. Cl.
*G02F 1/136* (2006.01)
*G02F 1/1343* (2006.01)

(52) U.S. Cl. .......................................... 349/42; 349/39

(58) Field of Classification Search ................... 349/42, 349/39
See application file for complete search history.

(56) References Cited

U.S. PATENT DOCUMENTS

| 6,940,566 B1* | 9/2005 | Rho et al. ...................... 349/42 |
| 7,180,565 B2* | 2/2007 | Hong et al. ................... 349/141 |
| 2004/0001176 A1* | 1/2004 | Kim et al. .................... 349/139 |
| 2007/0109248 A1* | 5/2007 | Ilsaka .......................... 345/99 |

* cited by examiner

*Primary Examiner*—Uyen Chau N Le
*Assistant Examiner*—Hoang Tran
(74) *Attorney, Agent, or Firm*—Bacon & Thomas, PLLC

(57) ABSTRACT

An active array substrate for an LCD is disclosed. The active array substrate uses one end of the second scan line to electrically connect to the first scan line and electrically insulates the remaining second scan line from the first scan line. Accordingly, the second scan lines can be shielded the voltage of the transmission waveform on the first scan lines, and obtain a result of reduce a distortion level of a waveform, enhance the uniformity of the brightness, enhance the contrast of the LCD, and reduce the image flicker phenomenon of the LCD.

17 Claims, 9 Drawing Sheets

ACTIVE ARRAY SUBSTRATE FOR A LIQUID CRYSTAL DISPLAY

BACKGROUND OF THE INVENTION

1. Field of the Invention

The present invention relates to an active array substrate and, more particularly, to an active array substrate for a liquid crystal display (LCD).

2. Description of Related Art

In reference to LCD panel technologies, the structure of storage capacitance Cs on a scan line (hereinafter, referring to as "Cs on Gate") is designed and produced by implementing and overlapping an insulation layer between a scan line and a pixel electrode.

In general, as compared with the structure of storage capacitance on a common line (hereinafter, referring to as "Cs on Common") that is produced by overlapping a common line and a pixel electrode, the pixels formed by the structure "Cs on Gate" have the advantage of preferred aperture ratio because the storage capacitance is stacked on the scan line without additional affecting the aperture ratio, but also have the disadvantage of suffering a higher load on the scan line due to the capacitance connected in series on the scan line.

Accordingly, for the structure "Cs on Gate", the RC delay on the scan line causes the transmission waveform to have a quite sharp distortion. FIG. 1A is a schematic diagram of the waveform before passing through the scan line. FIG. 1B is a schematic diagram of the waveform after passing through the scan line.

As shown in FIGS. 1A and 1B, the waveform passing through the scan line is gradually changed and distorted, which causes at least one of the non-uniform brightness, the non-uniform contrast, and frame flicker of the LCD, and further affects the display quality.

Therefore, it is desirable to provide an improved active array substrate to mitigate and/or obviate the aforementioned problems.

SUMMARY OF THE INVENTION

The object of the present invention is to provide an active array substrate, which can improve the distortion of waveform passing through the scan line to thereby enhance the brightness, enhance contrast uniformity, and reduce the image flicker phenomenon of the liquid crystal display.

To achieve the object, an active array substrate is provided. The active array substrate includes an insulating substrate, a switch, a first scan line, a second scan line, a data line, and a pixel electrode. The switch is located on the insulating substrate. The first scan line is located on the insulating substrate and electrically connected to the switch. The second scan line is overlapped at least part of the first scan line and has two opposite ends, one end electrically connected to the first scan line and other end is not electrically connected to the first scan line. The data line is located on the insulating substrate and electrically connected to the switch. The data line is substantially interlaced with the first scan line and electrically insulated from the first scan line. The pixel electrode is located on the insulating substrate and electrically connected to the switch, the pixel electrode is overlapped a part of the second scan line, and the pixel electrode and the second scan line there between having a first insulating layer.

In the present invention, the active array substrate is produced by a two conductive layer process. For the two conductive layer process, a part of the second scan line is adapted in one conductive layer with the first scan line, and the rest of the second scan line is adapted in the other conductive layer with the data line, or all the second scan line and the data line are adapted in a substantially identical conductive layer. However, the active array substrate can be produced by a process to contain more than two conductive layers.

Further, when the part of the second scan line is adapted in one conductive layer with the first scan line and the rest of the second scan line is adapted in the other conductive layer with the data line, the second scan line further includes two metal segments and an auxiliary connection pad. The two metal segments are overlapped the first scan line and electrically connected via the auxiliary connection pad. The auxiliary connection pad is located in the conductive layer with the first scan line on the insulating substrate. The auxiliary pad and the first scan line are electrically insulated by a first gap. Also, the auxiliary pad is electrically insulated from the pixel electrode.

Each of the metal segments includes a first extension line so as to electrically connect the auxiliary connection pad. A width of the first extension line is substantially smaller than an averaged width of the first scan lines.

The auxiliary connection pad is disposed at an interlaced area of the first scan line and the data line. A second insulating layer is disposed between the second scan line and the first scan line, between the data line and the first scan line, or between the data line and the auxiliary connection pad. Preferably, the second insulating layer is disposed between the second scan line and the first scan line, between the data line and the first scan line, and between the data line and the auxiliary connection pad to thereby complete an equivalent circuit that the second scan line is overlapped the first scan line, the first and second scan lines are substantially interlaced with the data line, the first scan line and the second scan line are electrically connected only at one end, and the data line and the other ends of the first and second scan lines are electrically insulated. In additional, when both the second scan line and the data line are formed in the substantially identical conductive layer, the data line further includes an auxiliary connection pad, which is formed in a conductive layer with the first scan line on the insulating substrate and electrically insulated from the first scan line by a first gap. The auxiliary connection pad is also electrically insulated from the pixel electrode.

Accordingly, the second scan line further includes a second extension line with a width is substantially smaller than an averaged width of the second scan lines. The second extension line is correspondingly disposed to an auxiliary connection pad of the data line, such that the second scan line can be floated on the auxiliary connection pad of the data line to thereby electrically insulate from the data line.

However, the auxiliary connection pad of the data line can be disposed at an intersection of the first scan line and the data line. A second insulating layer is disposed between the second scan line and the first scan line, between the data line and the first scan line, or between the data line and the auxiliary connection pad. Preferably, the second insulation layer is disposed between the second scan line and the first scan line, between the data line and the first scan line, and between the data line and the auxiliary connection pad to thereby complete an equivalent circuit that the second scan line is overlapped the first scan line, the first and second scan lines are substantially interlaced with the data line, the first scan line and the second scan line are electrically connected only at one end, and the data line and the other ends of the first and the second scan lines are electrically insulated.

The first scan line can include a recess is located at an interlaced area of the first scan line and the auxiliary connection pad is adapted to accommodate a part of the auxiliary connection pad. However, in other embodiments, the recess can be accommodated the entire auxiliary connection pad. Thus, the auxiliary connection pad can have a width is substantially smaller than the averaged width of the first scan lines.

The switch can be a thin film transistor (TFT) or an equivalent. The TFT has a gate electrode, a source electrode and a drain electrode.

The averaged width of the first scan lines is substantially greater than or substantially equal to that of the second scan line. Preferably, the first and the second scan lines have a substantially identical averaged width.

Preferably, the first scan line is substantially vertical interlaced with the data line and substantially parallel to the auxiliary connection pad, but not limited to it.

DETAILED DESCRIPTION OF THE PREFERRED EMBODIMENT

Figure 1A:
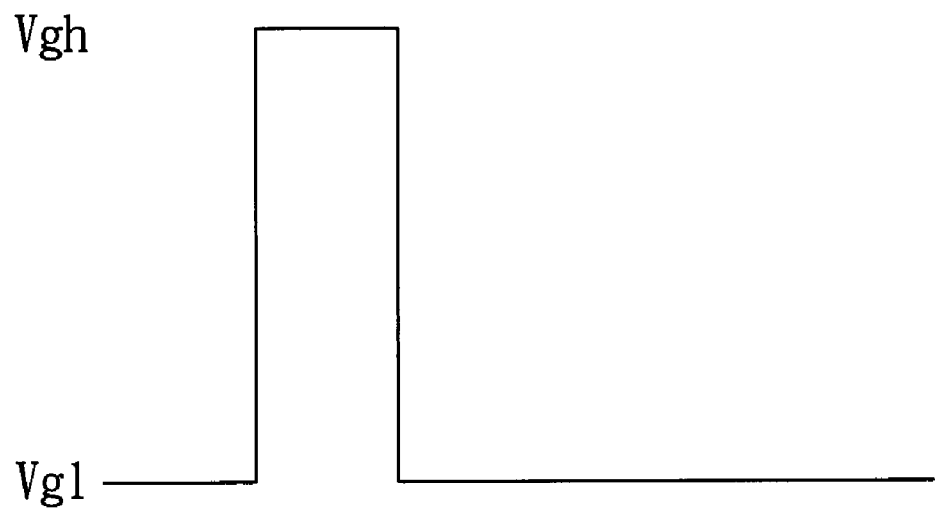
FIG. 1A is a schematic diagram of the waveform before passing through the scan line.
Figure 1B:
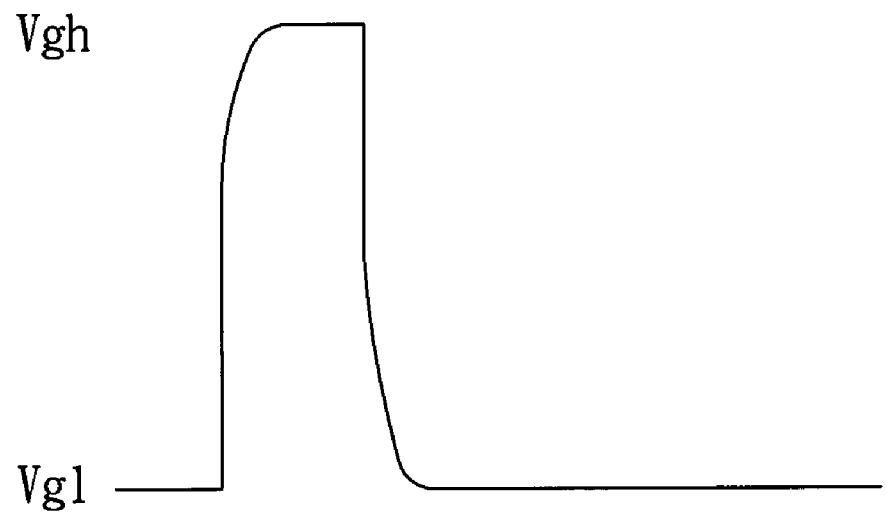
FIG. 1B is a schematic diagram of the waveform after passing through the scan line.
Figure 2:
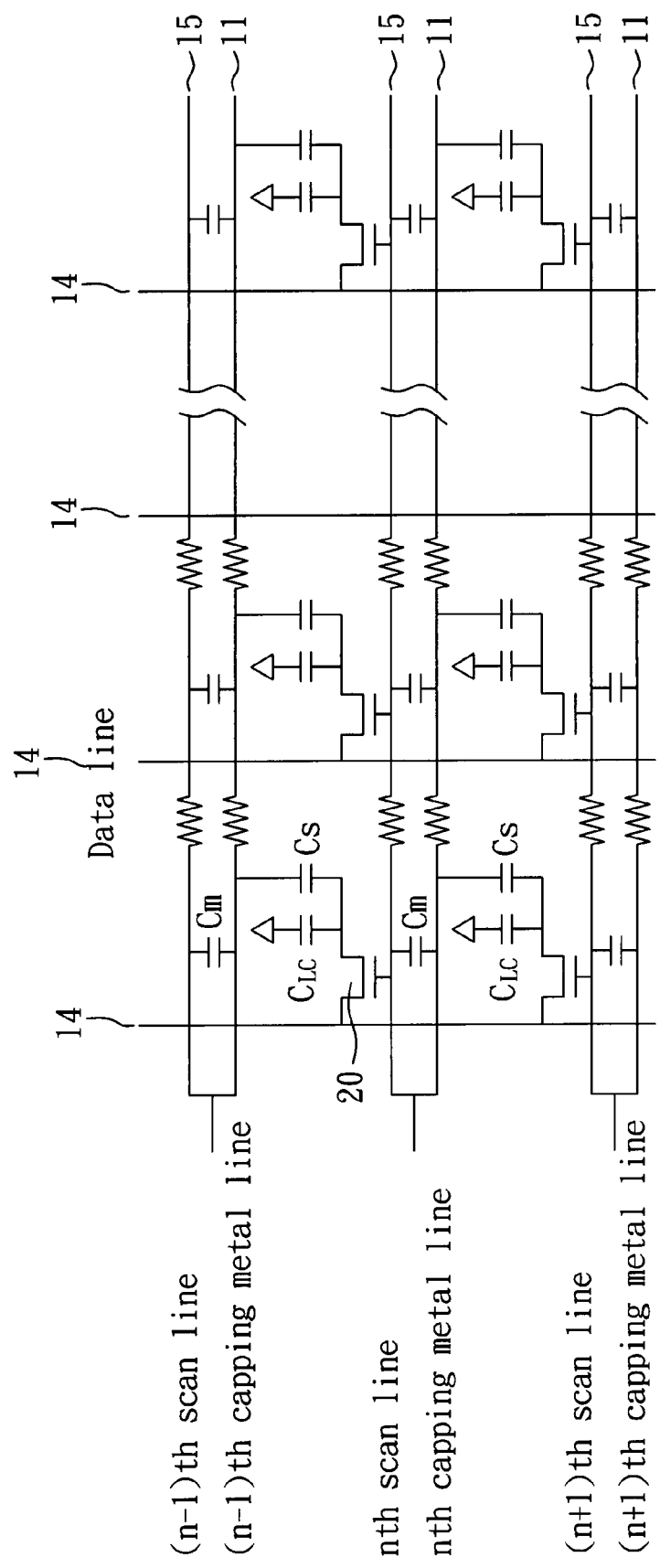
FIG. 2 shows a schematic diagram of a display circuit according to a one embodiment of the present invention.

FIG. 2 shows a schematic diagram of a display circuit according to one embodiment of the present invention.

As shown in FIG. 2, the display circuit forms a minor capacitance Cm between a capping metal line and a scan line.

Figure 3A:
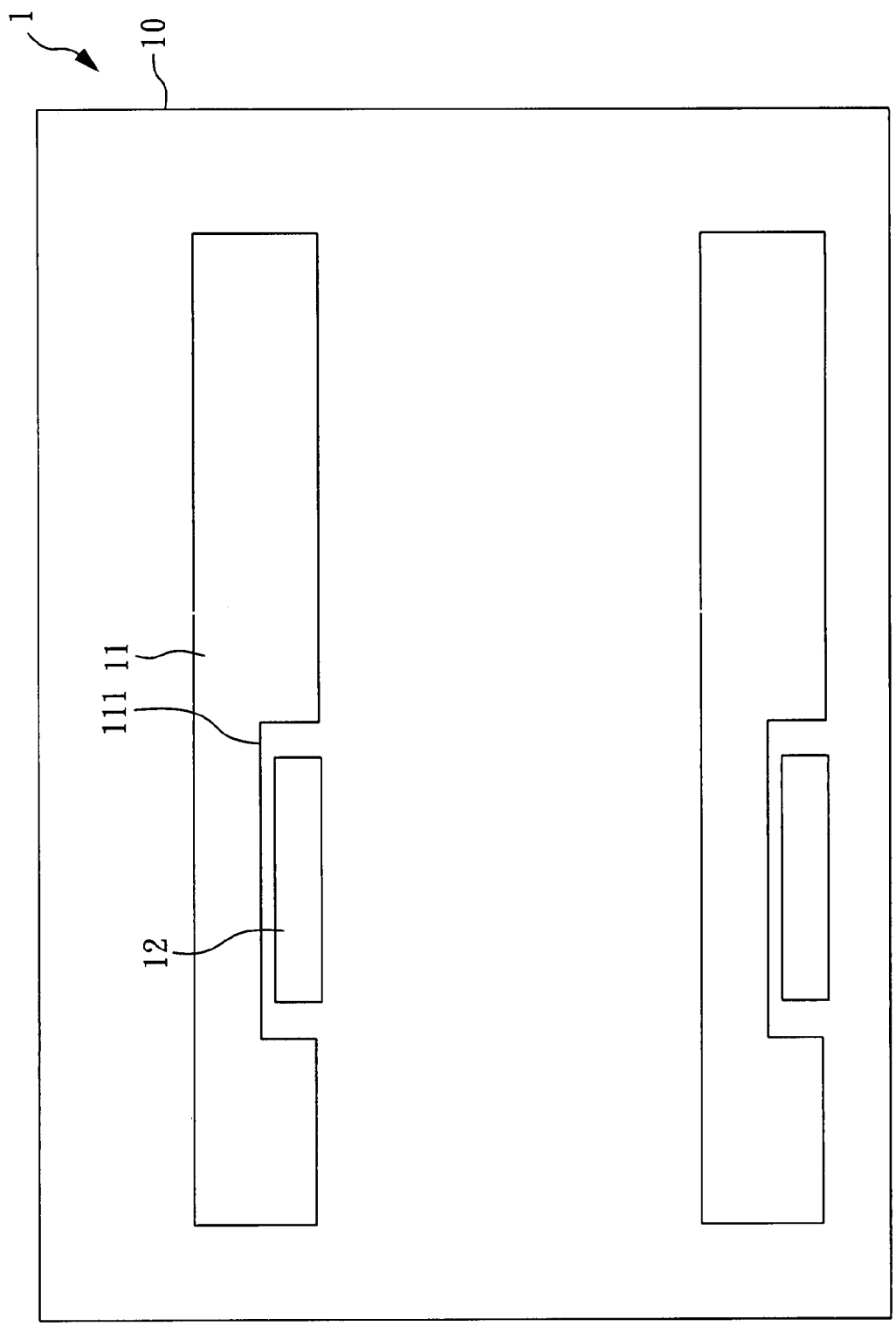
FIGS. 3A to 3D are a schematic flowchart of producing an active array substrate equivalent to the display circuit of FIG. 2 according to the embodiment of the present invention.
Figure 3B:
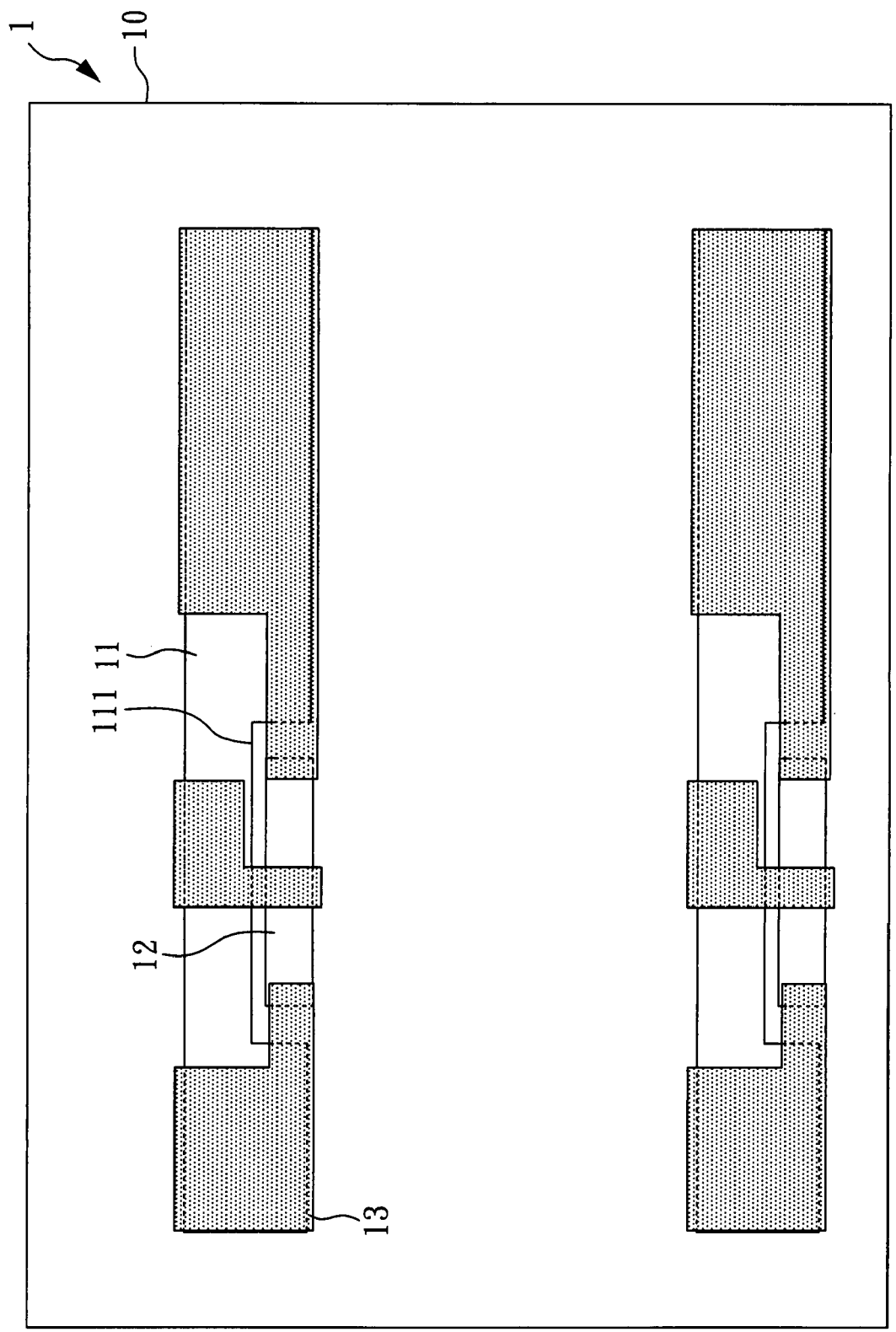
Figure 3C:
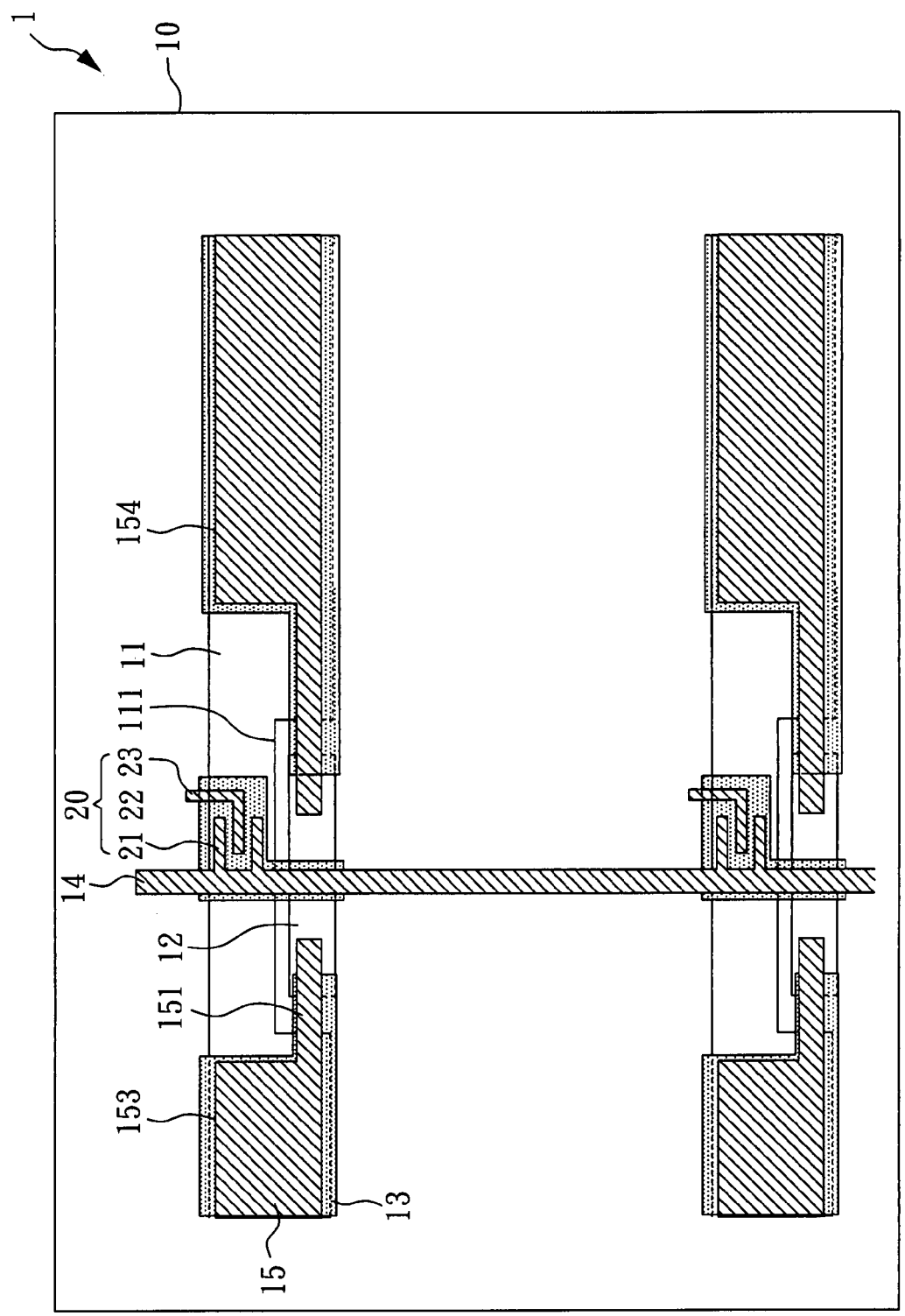

FIGS. 3A to 3D are a schematic flowchart of producing an active array substrate equivalent to the display circuit of FIG. 2 according to the embodiment of the present invention. FIG. 4 is a cross-sectional view of the substrate at the notation I-I of FIG. 3D according to the embodiment of the present invention. The following is described by referring to both of FIGS. 3A-3D and 4.

Figure 3D:
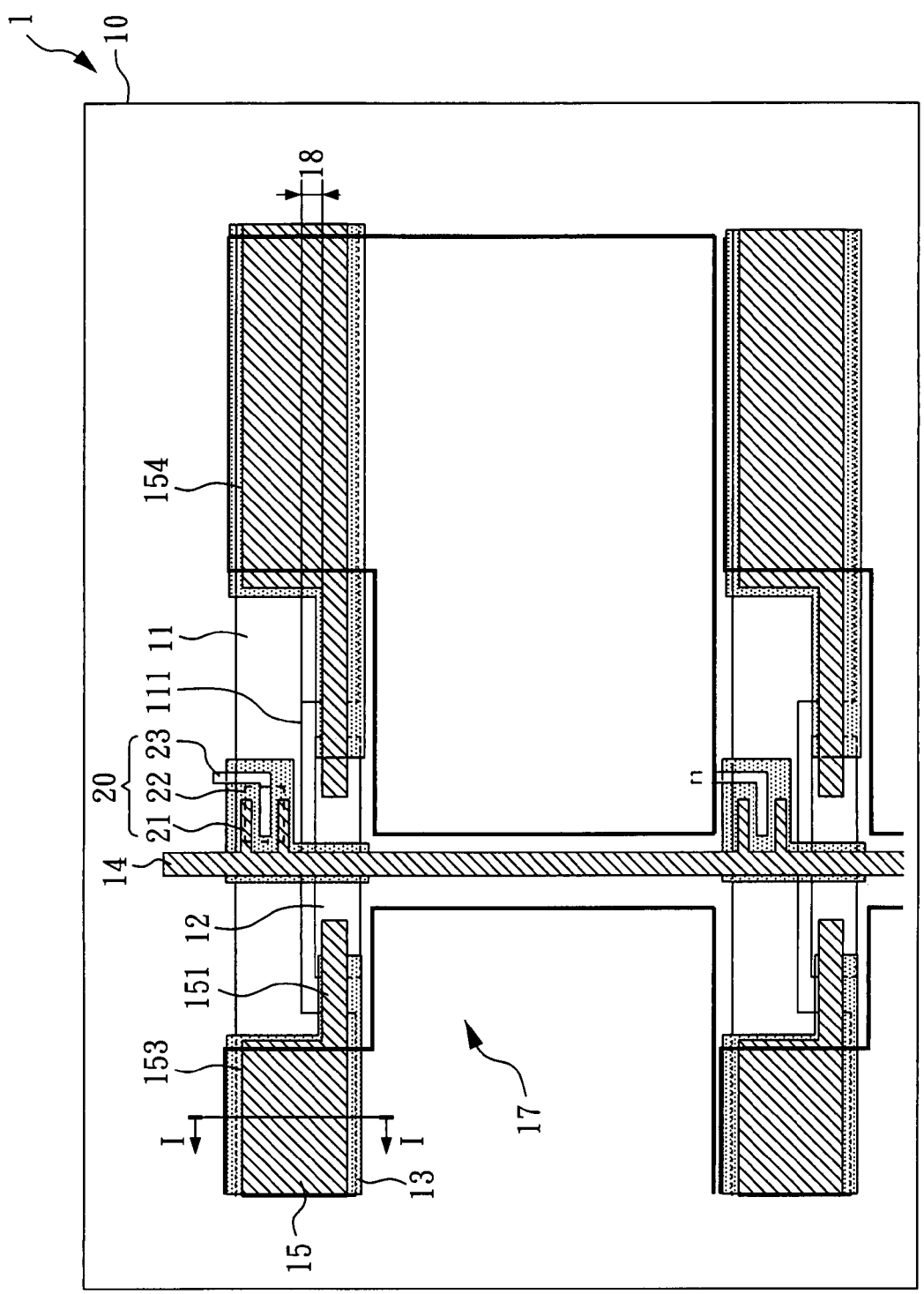
Figure 4:
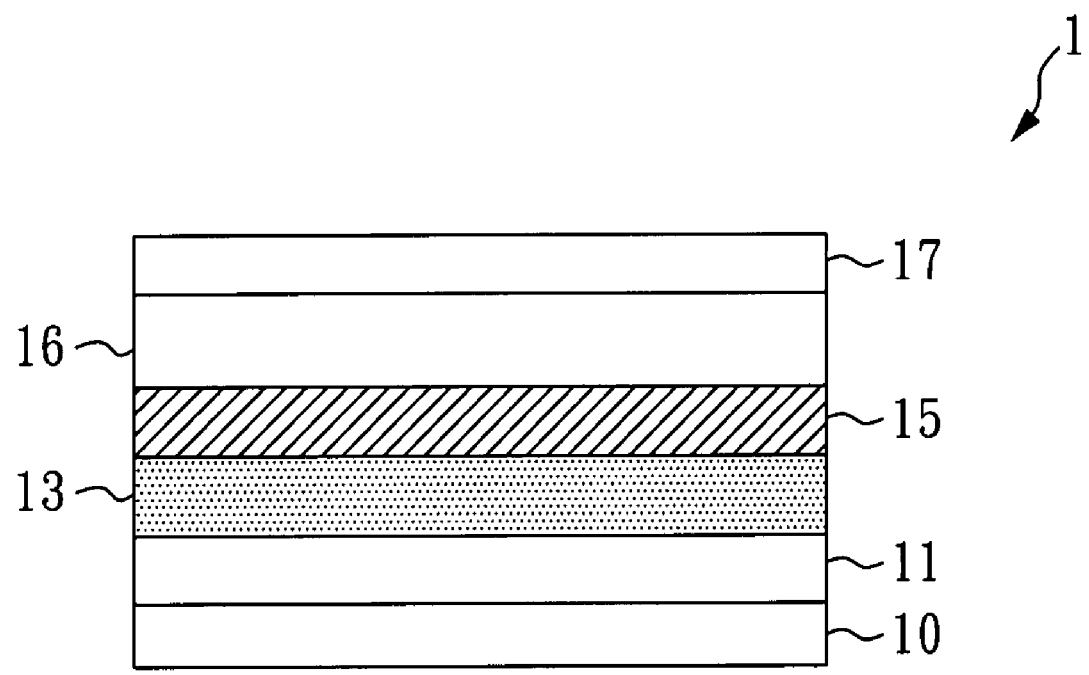
FIG. 4 is a cross-sectional view of the substrate at the notation I-I of FIG. 3D according to the embodiment of the present invention.

In FIG. 3D, the active array substrate 1 for an LCD includes a plurality of switches 20, a plurality of first scan lines 11, a plurality of second scan lines 15, a plurality of data lines 14, and a plurality of pixel electrodes 17. In addition, each second scan line 15 includes a plurality of auxiliary connection pads 12.

The process for the substrate 1 is started, as shown in FIG. 3A, to use a first metal material layer to form the first scan lines 11 and the auxiliary connection pads 12 on an insulating substrate 10. The first scan lines 11 are substantially parallel to the auxiliary connection pads 12. Each first scan line 11 has a recess 111 is located at an interlaced area of the first scan line 11 and the auxiliary connection pad 12 is adapted to accommodate at least part of the auxiliary connection pad 12. In addition, a first gap 18 is located between the auxiliary connection pad 12 and the first scan line 11 is adapted to electrically insulate the connection pad 12 and the first scan line 11 from each other. The width of the auxiliary connection pad 12 is substantially smaller than the averaged width of the first scan lines 11.

Next, as shown in FIG. 3B, a second insulating layer 13 is formed at least on the first metal material layer where the data line 14 and the second scan line 15 are predetermined. Next, as shown in FIG. 3C, the patterns of the data lines 14 and the second scan lines 15 are formed on the second insulating layer 13, so as to form the switches 20.

The second insulating layer 13 between the second scan line 15 and the first scan line 11 covers all overlaps of the first and second scan lines 11 and 15 except for areas where the first scan line is electrically connected to the scan driving unit, such that the first scan line 11 is electrically connected to the second scan line 15 by an end where a waveform is input. In addition, the conductor-insulator-conductor structure formed by the second scan line 15, the second insulating layer 13, and the first scan line 11 forms a minor capacitance.

The data lines 14 are substantially vertical interlaced with the first scan lines 11 and the auxiliary connection pads 12, and a second insulating layer 13 is located at one of the overlaps between the first scan line 11 and the data line 14 and between the first scan line 11 and the auxiliary connection pad 12 so as to let the data lines 14 and the first scan lines 11 at the interlaced area is electrically insulate from each other and the auxiliary connection pads 12 and the first scan lines 11 at the interlaced area is electrically insulate from each other.

The second scan lines 15 is overlapped the part of the first scan lines 11 and are formed through the auxiliary connection pads 12. Each of the first and second scan lines 11 and 15 is electrically connected only by one end, not by both electrically connected in parallel. In present embodiment of the invention, the averaged width of the second scan lines 15 is substantially equal to the averaged width of the first scan lines 11. Beside, each second scan line 15 includes two metal segments 153 and 154 overlapped on the first scan line 11. The metal segments 153 and 154 are electrically connected through the auxiliary connection pads 12 to each other. The metal segments 153 and 154 respectively connect to the auxiliary connection pad 12 via a first extension line 151. The width of the first extension line 151 is substantially smaller than the averaged width of the first scan lines 11.

It is noted that at the interlaced area of the first scan line 11 and the data line 14, the first extension line 151 is required for electrically connecting the metal segments 153 and 154 with the auxiliary connection pad 12 because the metal segments 153 and 154 and the data-lines 14 are formed of a substantially identical metal material, such that the auxiliary connection pad 12, the first scan line 11, and the data line 14 can electrically insulated from each other. In addition, the second scan line 15 and the data line 14 can be formed in a same metal layer, and accordingly the second scan line 15, the first scan line 11, and the data line 14 are maintained at an electrically insulating circuit structure.

Each switch 20 can comprise a thin film transistor (TFT) with a gate electrode 22, a source electrode 21, and a drain electrode 23. The gate electrode 22 is electrically connected to the first scan line 11 which has one end connected to the scan driving unit of the LCD (not shown), and the source electrode 21 is electrically connected to the data line 14 which has one end connected to the data driving unit of the LCD (not shown), thereby adapted to control the data signal inputs of the scan and data driving units of the LCD.

Finally, as shown in FIG. 3D, the pattern of a pixel electrode 17 is formed. The pixel electrode 17 is electrically connected to the drain electrode 23 of the switch 20, and the pixel electrode 17 overlaps a part of the second scan line 15, which is not electrically connected. At this point, the substrate 1 for the LCD is complete.

The abovementioned the pixel electrode 17 is electrically connected to the drain 23 of the switch 20 but not to the data line 14, the first scan line 11, and the second scan line 15. In addition, the pixel electrode 17 overlaps the part of the second scan line 15, and a first insulating layer 16 is disposed between the pixel electrode 17 and the second scan line 15.

A liquid crystal (LC) layer (not shown) is deposited between the pixel electrode 17 and an opposite substrate (not shown) to thereby form a liquid crystal capacitance $C_{LC}$. Thus, the pixel electrode 17, the first insulating layer 16, and the second scan line 15 forms a conductor-insulator-conductor structure to thereby form a storage capacitance $C_S$.

In present embodiment of the invention, the first scan line 11 and the second scan line 15 are electrically connected at an input terminal of a scan signal waveform. That is, the first scan line 11 and the second scan line 15 transmit a substantially identical waveform input and have no voltage difference. Thus, the first scan line 11 is not affected by the second scan line 15 and accumulates the charge in the minor capacitance. Namely, the second scan line 15 shields the first scan line 11. That is, the storage capacitance produced by the conductor-insulator-conductor structure formed of the pixel electrode 17, the first insulation layer 16, and the second scan line 15 does not affect the transmission waveform of the first scan line 11. Accordingly, the voltage level of the waveform at the end of the first scan line 11 is maintained without distortion, enhancing the brightness, enhancing contrast uniformity, and reducing the image flicker phenomenon of the LCD is achieved.

Figure 5:
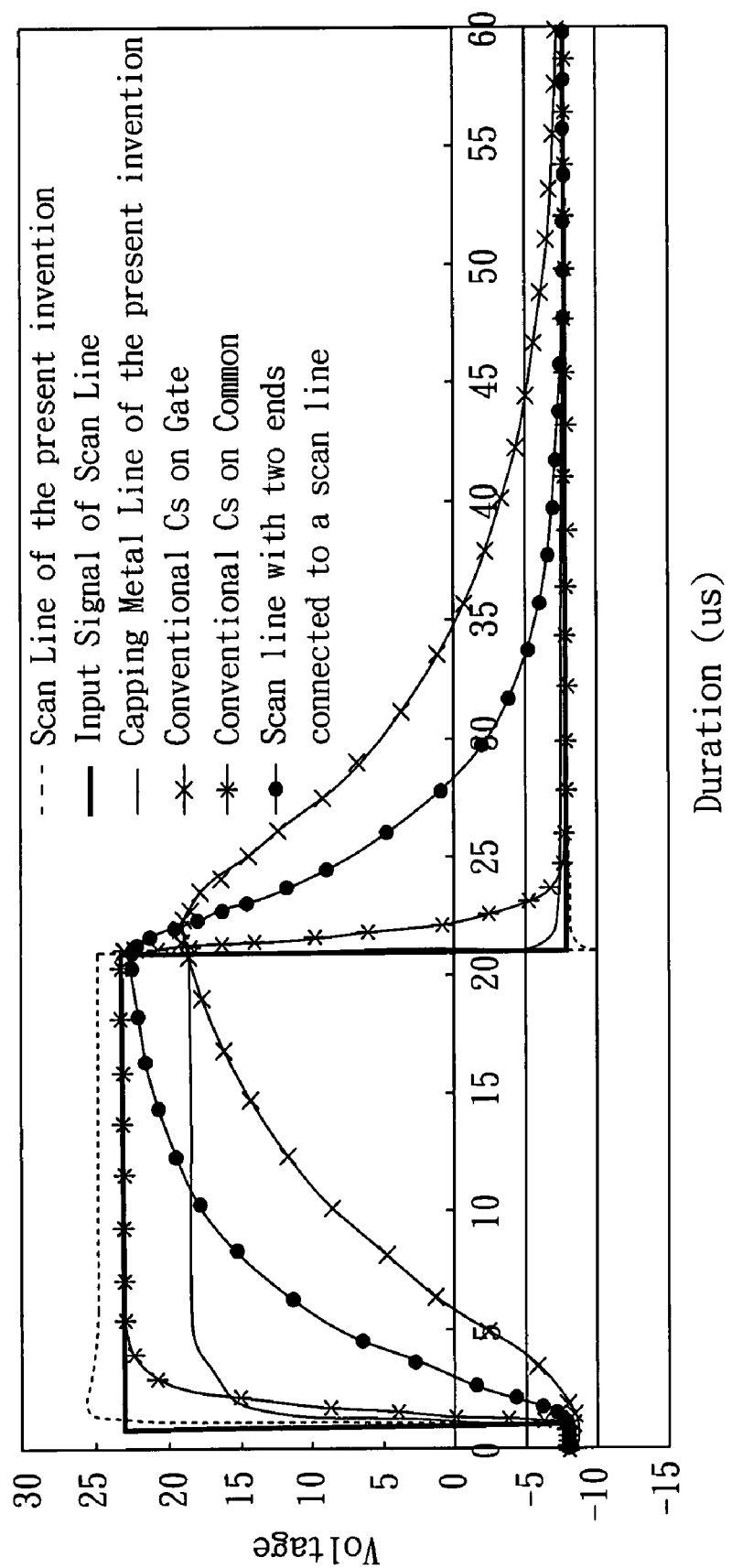
FIG. 5 is a graph of an simulation comparison of the display circuits of the present invention and the prior art.

FIG. 5 is a graph of a comparison of the display circuits of the present invention and the prior art. As shown in FIG. 5, the simulation result of the (first) scan lines of the present invention, an input signal (Gate Input) at each input terminal of the scan lines, the capping metal lines (second scan lines) of the present invention, a conventional Cs on Common, a conventional Cs on Gate, and adding a typical metal line to each first scan line of a conventional Cs on Gate by electrically connecting two ends is shown.

The simulation result of present embodiment of the present is obtained with a total resistance of about 2187 ohms on the first scan lines 11, a total capacitance of about 657 pF between the first scan lines 11 and the ground line, a total resistance of about 2187 ohms on the second scan lines 15, a total storage capacitance of 6957 pF, and a total minor capacitance of about 2700 pF. In this figure, "Gate End (with capping line)" denotes a simulation signal at the end of a first scan line 11, and "Capping Line End" denotes a simulation signal at the end of a second scan line 15.

The simulation result of the conventional Cs on Common is obtained with a total resistance of about 2187 ohms on the scan lines, a total capacitance of about 657 pF between the scan lines and the ground. In this figure, "Gate End (Cs on Common)" denotes a simulation signal at the end of a scan line.

The simulation result of the conventional Cs on Gate is obtained with a total resistance of about 2187 ohms on the scan lines, a total capacitance of about 657 pF between the scan lines and the ground, and a total storage capacitance of about 6957 pF. In FIG. 5, "Gate End (Cs on Gate)" denotes an emulation signal at the end of a scan line.

The emulation result of adding a typical metal line to each first scan line of a conventional Cs on Gate by electrically connecting two ends is obtained with a total resistance of about 2187 ohms on the (first) scan lines, a total capacitance of about 657 pF between the (first) scan lines and the ground, a total resistance of about 2187 ohms on the metal lines, a total storage capacitance of about 6957 pF, and a total capacitance of about 2700 pF between the (first) scan lines and the metal lines. In this figure, "Capping line end connected with Gate line" denotes an emulation signal at the end of a scan line.

As shown in FIG. 5, the waveform at the end of a first scan line in this embodiment is substantially better than those of the conventional Cs on Gate and the design of adding a metal line to each first scan line of a conventional Cs on Gate by electrically connecting two ends.

Figure 6:
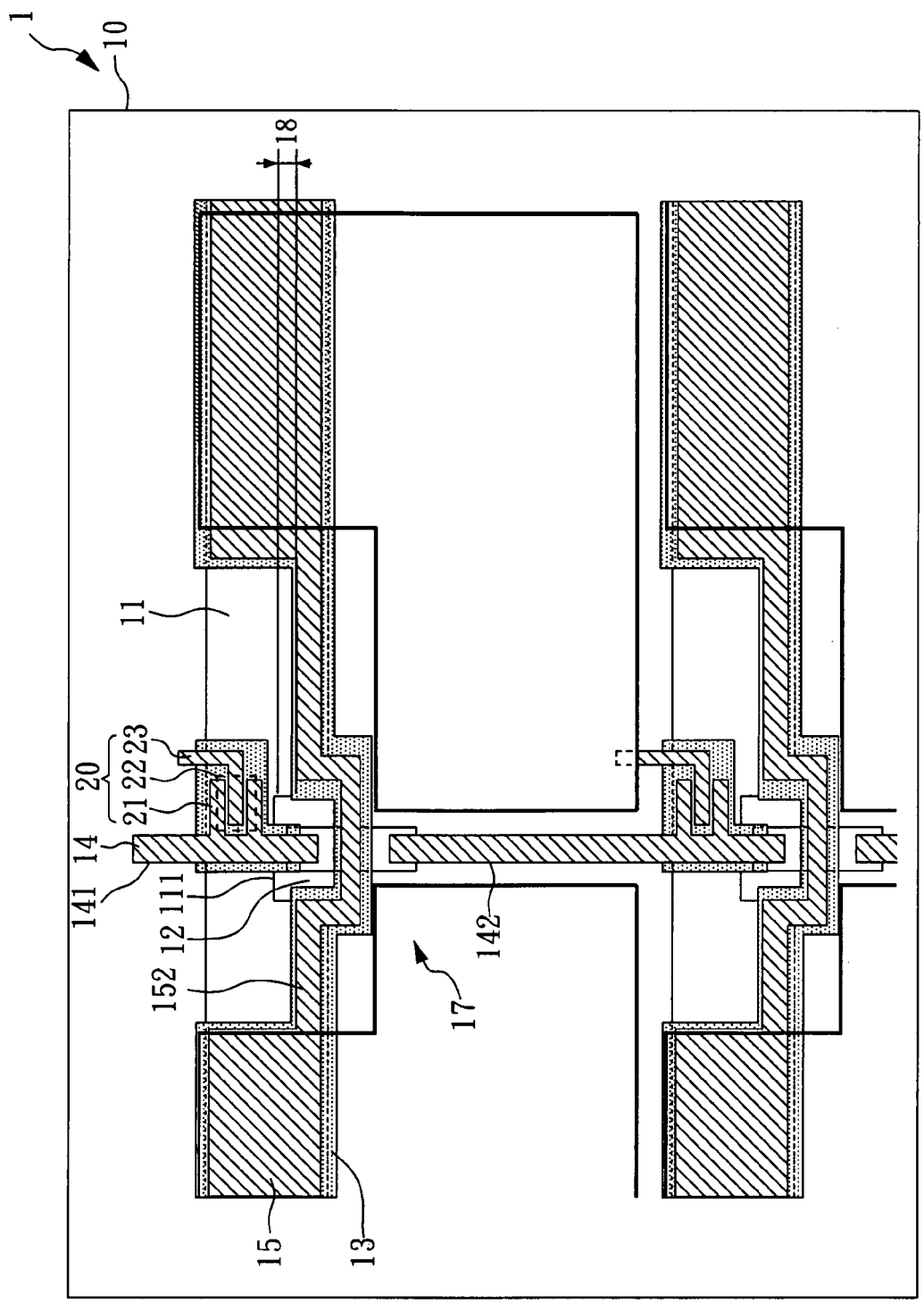
FIG. 6 is a schematic view of another active array substrate equivalent to the display circuit of FIG. 2 according to another embodiment of the present invention.

FIG. 6 is a schematic view of another active array substrate equivalent to the display circuit of FIG. 2 of another embodiment of the present invention.

As shown in FIG. 6, the difference between the embodiments of FIGS. 2 and 6 is on the auxiliary connection pads 12, the second insulating layer 13, the second scan lines 15, and the data lines 14, and for the clarity, no more description is given to the same ones.

In present embodiment, the active array substrate 1 for an LCD includes a plurality of switches 20, a plurality of first scan lines 11, a plurality of second scan lines 15, a plurality of data lines 14, and a plurality of pixel electrodes 17. Each second scan line 15 includes a plurality of auxiliary connection pads 12. Each switch 20 includes a gate electrode 22, a source electrode 21, and a drain electrode 23. A first scan line 11 has at least one recess 111 is adapted to accommodate at least one part of the auxiliary connection pad 12, and a first gap 18 is located between the auxiliary connection pad 12 and the first scan line 11. A data line 14 is electrically connected by two metal segments 141, 142 to the auxiliary connection pad 12 is adapted to maintain a substantially interlaced with the first scan lines 11 and electrically insulated with the first scan lines 11. In present embodiment, the pattern of the auxiliary connection pads and position of the auxiliary connection pads 12 is substantially different from those of FIG. 2. Accordingly, each first scan line 11 includes a recess located at the interlaced area of the first scan line 11 and the auxiliary connection pad 12 is adapted to accommodate a part of the auxiliary connection pad 12.

Each data line 14 includes a plurality of auxiliary connection pads 12, and each second scan line 15 forms a second extension line 152 above the auxiliary connection pad 12 and the second insulating layer 13. The second extension line 152 is electrically insulated from the auxiliary connection pad 12.

In addition, the second insulating layer 13 is substantially interlaced in the overlaps of the second scan lines 15 and the auxiliary connection pads 12 is adapted to electrically insulate.

Therefore, the present invention uses one end of each second scan line to electrically connect to the first scan line and electrically insulates the remaining second scan line from the first scan line. Accordingly, the second scan lines can shields the voltage of the transmission waveform on the first scan lines to reduce the distortion of the waveform, enhance the uniformity of the brightness, enhance contrast of the LCD, and reduce the image flicker phenomenon of the LCD.

Although the present invention has been explained in relation to its preferred embodiment, it is to be understood that many other possible modifications and variations can be made without departing from the spirit and scope of the present invention as hereinafter claimed.

What is claimed is:

1. An active array substrate, comprising:
   a switch located on an insulating substrate;
   a first scan line, located on the insulating substrate, and electrically connected to the switch;

a second scan line, overlapped at least part of the first scan line, and has two opposite ends, one end electrically connected to the first scan line and other end is not electrically connected to the first scan line;

a data line, located on the insulating substrate, and electrically connected to the switch, wherein the data line is substantially interlaced with the first scan line and insulated from the first scan line; and a pixel electrode located on the insulating substrate and electrically connected to the switch, the pixel electrode is overlapped a part of the second scan line, and the pixel electrode and the second scan line there between having a first insulating layer.

2. The active array substrate of claim 1, wherein the second scan line is formed by electrically connecting two metal segments and an auxiliary connection pad.

3. The active array substrate of claim 2, wherein a first gap between the auxiliary connection pad and the first scan line is adapted to electrically insulate the auxiliary connection pad from the first scan line and the pixel electrode.

4. The active array substrate of claim 2, wherein a width of the auxiliary connection pad is substantially smaller than an averaged width of the first scan line.

5. The active array substrate of claim 2, wherein the first scan line has a recess is located at an interlaced area of the first scan line and the auxiliary connection pad is adapted to accommodate at least one part of the auxiliary connection pad.

6. The active array substrate of claim 2, wherein each metal segment has a first extension line connected to the auxiliary connection pad, and a width of the first extension line is substantially smaller than an averaged width of the first scan line.

7. The active array substrate of claim 2, wherein the second scan line and the data line are formed of a substantially identical metal material.

8. The active array substrate of claim 2, wherein the first scan line and the auxiliary connection pad are formed of a substantially identical metal material.

9. The active array substrate of claim 2, wherein an averaged width of the first scan line is substantially equal to an averaged width of the second scan line.

10. The active array substrate of claim 2, wherein the first scan line is substantially vertical interlaced with the data line.

11. The active array substrate of claim 2, wherein the first scan line is substantially parallel to the auxiliary connection pad.

12. The active array substrate of claim 2, wherein the switch comprises thin film transistor (TFT) with a gate, a source, and a drain.

13. The active array substrate of claim 1, wherein the second scan line and the first scan line there between has a second insulating layer.

14. The active array substrate of claim 13, wherein the second insulating layer is located one of between the data line and the first scan line and between the data line and the auxiliary connection pad.

15. The active array substrate of claim 1, wherein the data line comprises an auxiliary connection pad, and a first gap between the auxiliary connection pad and the first scan line is adapted to electrically insulate the auxiliary connection pad from the first scan line and the pixel electrode.

16. The active array substrate of claim 15, wherein a width of the auxiliary connection pad is substantially greater than or substantially equal to an averaged width of the data line.

17. The active array substrate of claim 1, wherein the second scan line is connected to other second scan line via a second extension line.

* * * * *